UNITED STATES PATENT OFFICE.

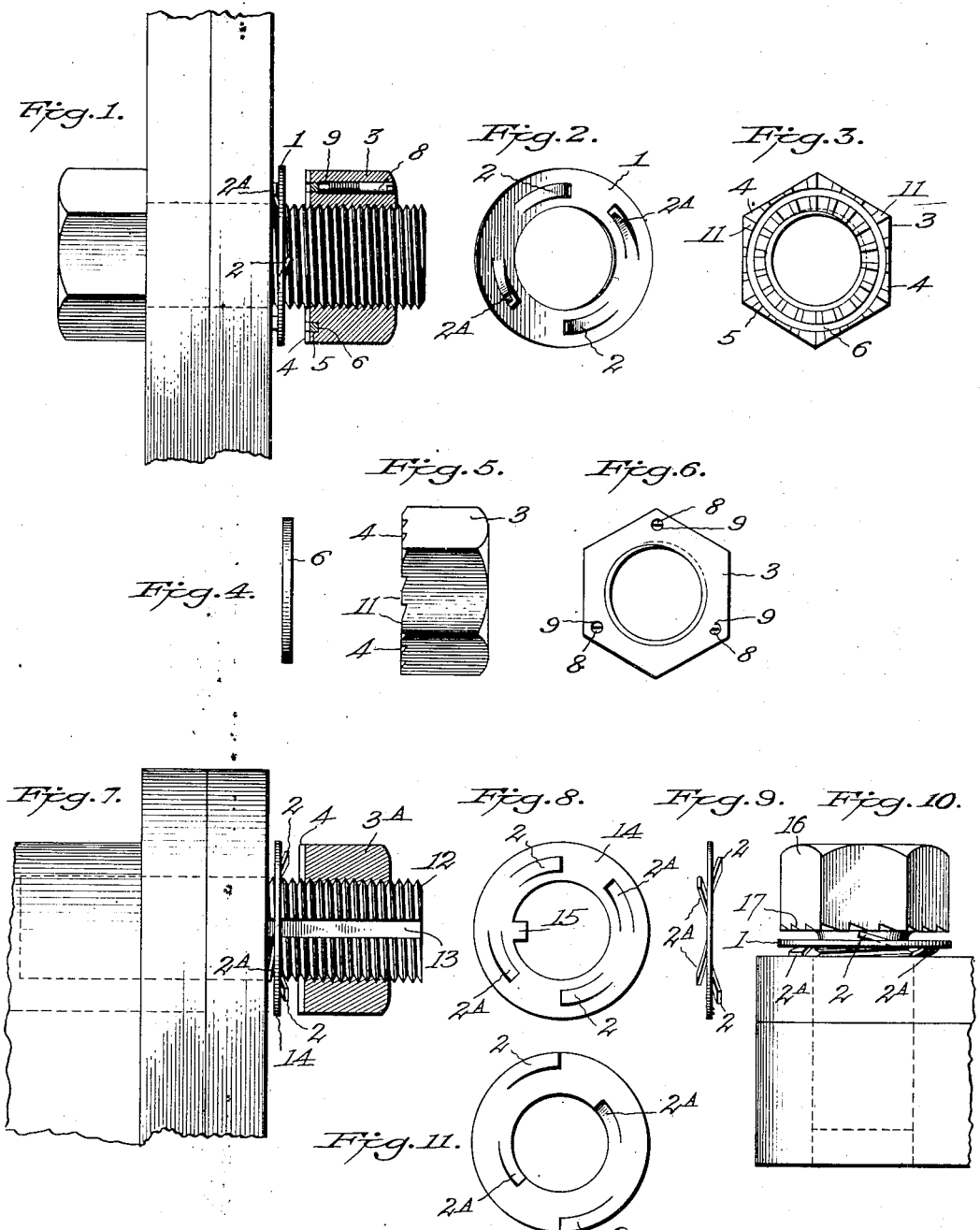

WILLIAM B. HICKEY AND BERT A. TOOTHAKER, OF DENVER, COLORADO.

COMBINED NUT AND WASHER LOCK.

1,033,585.     Specification of Letters Patent.     Patented July 23, 1912.

Application filed March 6, 1911. Serial No. 612,506.

*To all whom it may concern:*

Be it known that we, WILLIAM B. HICKEY and BERT A. TOOTHAKER, citizens of the United States of America, residing in the city and county of Denver and State of Colorado, have invented a new and useful Combined Nut and Washer Lock, of which the following is a specification.

Our invention relates to improvements in combined nut and washer locks, and the objects of our invention are: first—to provide a combined nut lock washer in which the washer has locking members on its opposite sides and the nut of which is arranged with a lock releasing device; and second—to provide a simple lock washer that is adapted to be locked to studs and nuts which are provided with coöperating lock members. We attain these objects by the mechanism illustrated in the accompanying drawings, in which:

Figure 1 is a side view illustrating the preferred form of the nut locking device, the nut being shown in section on a bolt, upon which is placed the improved locking washer. Fig. 2 is a perspective view of the washer. Fig. 3 is a rear view of the improved locking nut, with the releasing ring thereon. Fig. 4 is an edge view of the releasing ring. Fig. 5 is an edge view of the nut. Fig. 6 is a front view of the same. Fig. 7 is a side view, partly in section, showing the nut and washer applied to a stud bolt, which is provided with a groove or keyway. Fig. 8 is a front view of a washer similar to that shown in Fig. 2, but having a tongue adapted to enter and engage the keyway shown in Fig. 7. Fig. 9 is an edge view of the same. Fig. 10 is a side view showing the application of the locking washer to a cap, screw, or bolt; and Fig. 11 is a front view, showing a slight modification in the form of the washer.

Similar letters of reference refer to similar parts throughout the several views.

Referring to the drawings, the numeral 1 designates a washer such as is commonly used on bolts, studs, and screws. This washer is provided with downwardly and also upwardly projecting tongues, fingers, or spurs 2 and 2ᴬ that project from opposite sides of it. These finger portions are cut, stamped, or pressed, or are otherwise formed by shearing cuts or slots made in the metal, which frees and separates from the washer one end of a narrow strip of metal, and these strips are pressed in alternate order around the washer in opposite directions from the opposite sides of the washer. These fingers can be positioned at any part of the width of the flange of the washer. We have illustrated them in the center of the width of the flange portion of the washer in Fig. 1, and at its inner and outer edge portions in Fig. 11. The projecting fingers on one side of the washer are arranged to stand with their free ends pointing in opposite directions from each other, which causes the free ends of the fingers of one side to point toward the free ends of the fingers of the other side. These washers are preferably made of spring sheet steel, and the locking fingers possess an inherent resilient tension that enables them to spring down flat under sufficient pressure to spring out again to their normal position when the pressure is relieved. The fingers 2ᴬ are adapted to embed themselves in wood, or to fit into or spring down into recesses formed in metal and arranged to receive them, when a nut is screwed down onto them.

The nuts 3 are provided with a row of radial ratchet teeth 4 on their bottom faces. A part of the length of each tooth is made flat to form a flat bearing surface for the engaging face of the nut, and the rest of each ratchet tooth is formed into ratchet tooth recesses. The lock fingers of the washer are preferably arranged at sufficient unequal distances apart to enable one of the lock fingers to engage a ratchet tooth without having to turn the nut a distance equal to the pitch or distance apart of the ratchet teeth. A circular groove 5 is formed in the bottom of the nut that cuts through the ratchet teeth far enough to receive a ring 6. This ring is made to fit slidably in the groove and to fit the groove close enough to require it to be pressed into place by hand and to stay in the slot without dropping out when the nut is handled carelessly. Consequently, the ring stays in the recess of the nut, unless forced out. This ring is used to push down the fingers of the washer that are in mesh with and lie in engaging relation to the ratchet teeth of the nut.

Whenever it is desired to unscrew a nut after it has been once screwed down and locked to a washer that is locked to the piece of material it is clamped against and in order to move the ring 6 down against the fingers of the washer, we provide the nut with several screws 8, which are threaded in apertures 9, that are arranged over the ring through the nut, and the screws are threaded in these apertures and are made enough shorter than the thickness of the nut to lie in the threaded apertures below the top surface of the nut when their lower ends rest on the ring 6. A screw driver slot is formed in the top of each screw, and when it is desired to force the ring down to move the fingers out of contact with the ratchet teeth the screws 8 are each in their turn screwed down against the ring until they move it out of its slot beyond the flat faces 11 of the ratchet teeth.

In Fig. 7 the locking device is shown in connection with a stud bolt 12, and this bolt is provided with a longitudinal groove or key way 13. The washer 14, shown in this view, and in Fig. 8, is formed with a tongue or projection 15, extending in radially from the margin of its bolt receiving aperture, and this tongue is adapted to lie in the groove or keyway 13, when the washer is placed upon the bolt and thus form a means of preventing the washer from turning. This form of washer may be used in connection with the tongues 2^A, shown in Figs. 2 and 8, or without them, and this form of washer may also be used with ordinary bolts provided with grooves, as shown in Fig. 9. The nut 3^A, shown in Fig. 7, is provided with ratchet teeth 4, but the ring 6, shown in Figs. 1 and 3, is dispensed with.

In Fig. 10 the locking washer is shown in connection with a cap screw 16, the under side of the head of which is provided with ratchet teeth 17, similar to those shown on the nuts illustrated in Figs. 3 and 5. When thus employed, the washer is placed upon the cap screw or bolt, and the bolt is screwed down against the face of the object it is designed to hold, the tongues of the washer engaging the ratchet teeth on the head of the bolt in the same manner as the nut is engaged in Figs. 1 and 7. When the cap screw is screwed into wood, the tongues 2^A will become embedded therein, and prevent the washer from turning, and when the cap screw is screwed into metal one or more notches may be made in the metal by a punch or chisel, beforehand, which will be engaged by the said tongues, and thus prevent the washer from turning.

The operation of our improved combined nut lock washer is as follows: The washer is placed on a bolt, cap screw, or stud bolt, and if the material through which the bolt extends and against which the washer bears is wood, the fingers on the side of the washer adjacent to the wood will sink into it as the nut or the head of the bolt or stud is screwed down tightly against it; but where the bolt, cap screw or stud extends through metal and the washer engages metal, a slight recess can be made in it with a chisel or center punch, or may be cast or pressed into the pieces where a large number of pieces are to be used, such as in fish plates and in duplicate parts of machines where a positive lock is desired. As the nut or bolt, or cap screw is screwed down against the washer, its ratchet teeth run over the fingers of the adjacent side of the washer and when screwed tightly one of the fingers is left in mesh with one of the ratchet teeth. The nut or head is then locked to the washer so that it cannot accidentally unscrew, and, in fact, so that it cannot be forcibly unscrewed without destroying the washer, except that the ring 6 be moved against the ratchet engaging fingers and springs them away from the ratchet teeth, and substantially even with the thickness of the washer, into the places from which they were displaced. This is accomplished by turning the screws 8 down to move the ring 6 in its recess against the adjacent fingers of the washer. The heads of bolts and cap screws may be provided with this washer unlocking ring, as well as nuts.

Our invention is simple and practical, and provides a strong, positive locking combination nut and washer lock.

Having described our invention, what we claim as new and desire to secure by Letters Patent is:

1. In a combined nut and washer lock, a nut provided with ratchet teeth on its washer engaging face, a circular groove extending into said nut from its ratchet tooth side, a ring fitting therein with a self-holding fit, means for moving said ring slidingly out of said recess beyond the ends of said teeth, and a washer provided with a plurality of projecting, resiliently springing fingers arranged on opposite sides of said washer, the spring fingers of one side of said washer being adapted to enter into material below the general bearing surface of said washer and those on the opposite side being adapted to be run over by said nut and to lock into its ratchet teeth when the nut is turned in a direction that would unscrew it.

2. In a combined nut and washer lock, the combination of a bolt end portion such as a nut or a head having its material engaging end portion provided with a circumferential row of ratchet teeth, said teeth being provided for a portion of their length with a flat bearing portion, a circumferential recess extending into the bottom of said nut end portion, said recess being formed through the width of said teeth, a ring fitting with a sliding bearing fit in said recess of sufficient frictional contact to hold it in said recess against accidental displacement, said nut end being provided with a plurality of threaded apertures arranged at equidistances apart and in a circular path of the same diameter as said recess and extending from the outside surface of said nut into said recess, and a screw threaded into each of said threaded apertures and arranged in bearing contact with said ring, and means for turning said screw to move said ring out of its recess beyond the said ratchet teeth, with a washer provided with oppositely projecting, inwardly springing fingers, the fingers on one side of said washer being arranged to permit the ratchet teeth of said nut end to move over them when turned in one direction and to engage said ratchet teeth and lock said nut end to said washer when turned in the opposite direction, and the fingers of the opposite side of said washer being arranged to lock into any material against which said washer is pressed.

In testimony whereof we affix our signatures in presence of two witnesses.

WILLIAM B. HICKEY.
BERT A. TOOTHAKER.

Witnesses:
G. SARGENT ELLIOTT,
ADELLA M. FOWLE.